United States Patent
Lee et al.

(10) Patent No.: US 9,900,948 B2
(45) Date of Patent: Feb. 20, 2018

(54) REFERENCE VOLTAGE GENERATOR AND LIGHT EMITTING DIODE DEVICE COMPRISING THE SAME

(71) Applicant: FAIRCHILD KOREA SEMICONDUCTOR LTD., Bucheon (KR)

(72) Inventors: Minwoo Lee, Bucheon (KR); Moonsik Song, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 0 days.

(21) Appl. No.: 15/380,248

(22) Filed: Dec. 15, 2016

(65) Prior Publication Data

US 2017/0181237 A1 Jun. 22, 2017

Related U.S. Application Data

(60) Provisional application No. 62/269,330, filed on Dec. 18, 2015.

(51) Int. Cl.
*H05B 37/02* (2006.01)
*H05B 33/08* (2006.01)

(52) U.S. Cl.
CPC ..... *H05B 33/0845* (2013.01); *H05B 33/0815* (2013.01); *H05B 33/0887* (2013.01)

(58) Field of Classification Search
CPC ............ H05B 33/0815; H05B 33/0824; H05B 33/0845
USPC ................................. 315/186, 297
See application file for complete search history.

(56) References Cited

U.S. PATENT DOCUMENTS

| | | | | |
|---|---|---|---|---|
| 2004/0119452 A1* | 6/2004 | Florence | ................... | H03K 7/08 323/282 |
| 2007/0182395 A1* | 8/2007 | Sakai | ................... | H02M 3/1588 323/283 |
| 2008/0150449 A1* | 6/2008 | Wang | ................... | H05B 33/0815 315/291 |
| 2012/0068619 A1* | 3/2012 | Sung | ................... | H05B 33/0815 315/291 |
| 2014/0001968 A1* | 1/2014 | Sun | ..................... | H05B 33/0845 315/186 |
| 2014/0320031 A1* | 10/2014 | Wu | ..................... | H05B 33/0812 315/193 |
| 2015/0002044 A1* | 1/2015 | Han | ................... | H05B 33/0815 315/223 |
| 2015/0366028 A1* | 12/2015 | Jao | ......................... | H05B 37/00 315/185 R |
| 2017/0238385 A1* | 8/2017 | Sasaki | ................ | H05B 33/0845 349/61 |
| 2017/0290118 A1* | 10/2017 | Takagimoto | ....... | H05B 33/0845 |

* cited by examiner

*Primary Examiner* — Tung X Le
(74) *Attorney, Agent, or Firm* — Okamoto & Benedicto LLP

(57) ABSTRACT

A reference voltage generator disclosed herein includes an amplifier including two input terminals connected to a dimming signal and a first node, respectively, and an output terminal, a first transistor including a gate connected to the output terminal of the amplifier and one electrode connected to the first node, second and third transistors configured to form a current mirror, and two resistors connected between one electrode of the second transistor and one electrode of the first transistor.

18 Claims, 7 Drawing Sheets

REFERENCE VOLTAGE GENERATOR AND LIGHT EMITTING DIODE DEVICE COMPRISING THE SAME

CROSS-REFERENCE TO RELATED APPLICATION

This application claims priority to and the benefit of U.S. Patent Application No. 62/269,330 filed in the USPTO on Dec. 18, 2016, the entire contents of which are incorporated herein by reference.

BACKGROUND (a) Technical Field

Embodiments relate to a reference voltage generator and a light emitting diode (LED) device including the same.

(b) Description of the Related Art

A reference voltage may be generated according to a dimming signal for adjusting brightness of an LED string. The reference voltage is a voltage for controlling a current flowing at the LED string, and may have an upper limit reference and a lower limit reference based on the dimming signal.

For example, the upper limit reference may be set to a level higher by a predetermined margin based on a level of the dimming signal, and the lower limit reference may be set to a level lower by a predetermined margin based thereon.

When the brightness of the LED string is controlled below a predetermined ratio with respect to maximum brightness thereof by means of the dimming signal, the upper limit reference does not reach a zero voltage even though the lower limit reference reaches the zero voltage. Thus, there occurs a problem in that it is difficult to control the brightness of the LED string below the predetermined ratio according to the dimming signal.

SUMMARY

An object of the present disclosure is to provide a reference voltage generator and a light emitting diode (LED) device including the same which are capable of precisely controlling brightness of an LED string.

In accordance with one aspect of the present disclosure, a reference voltage generator includes an amplifier including two input terminals connected to a dimming signal and a first node, respectively, and an output terminal, a first transistor including a gate connected to the output terminal of the amplifier and one electrode connected to the first node, second and third transistors configured to form a current mirror, and two resistors connected between one electrode of the second transistor and the one electrode of the first transistor.

The amplifier may control a voltage at the first node with the dimming signal.

When a voltage of the dimming signal is less than a predetermined threshold value, a reference current flowing at the second transistor may depend on the dimming signal. When the voltage of the dimming signal is less than the predetermined threshold value, the reference current may be decreased as the dimming signal is decreased.

The reference voltage generator may generate a high limit dimming signal and a low limit dimming signal which are varied according to the reference current flowing at the second transistor.

The reference voltage generator may output a voltage obtained by adding a high limit reference, which is determined by the reference current flowing at a first resistor of the two resistors and the second transistor, to the dimming signal as a voltage of the high limit dimming signal, and the first resistor may be connected between the first transistor and the first node.

The reference voltage generator may output a voltage obtained by subtracting a low limit reference, which is determined by the reference current flowing at a second resistor of the two resistors and the second transistor, from the dimming signal as a voltage of the low limit dimming signal, and the second resistor may be connected between the first node and one electrode of the second transistor.

The reference voltage generator may further include a current source connected to a third transistor and configured to supply a constant current, wherein, when the voltage of the dimming signal is greater than the predetermined threshold value, the reference current flowing at the second transistor may depend on the constant current.

In accordance with another aspect of the present disclosure, a light emitting diode (LED) device includes an LED string, a power switch electrically connected to the LED string and configured to control a current flowing at the LED string, an inductor connected between the LED string and the power switch, and an LED driving device configured to generate a high limit dimming signal obtained by adding a high limit reference to a dimming signal and a low limit dimming signal obtained by subtracting a low limit reference from the dimming signal, and configured to control the current flowing at the LED string using the high limit dimming signal and the low limit dimming signal. When a voltage of the dimming signal is less than a predetermined threshold value, the high limit reference and the low limit reference may be varied.

The LED driving device may include a reference voltage generator configured to generate the high limit dimming signal and the low limit dimming signal according to the dimming signal.

When a voltage of the dimming signal is less than a predetermined threshold value, a changing rate of the high limit reference may be different from a changing rate of the low limit reference.

When the dimming signal reaches a predetermined minimum value, the high limit dimming signal and the limit dimming signal may be the same.

In accordance with embodiments, a reference voltage generator and an LED device including the same which are capable of precisely controlling brightness of an LED string are provided.

DETAILED DESCRIPTION OF THE EMBODIMENTS

Figure 1:
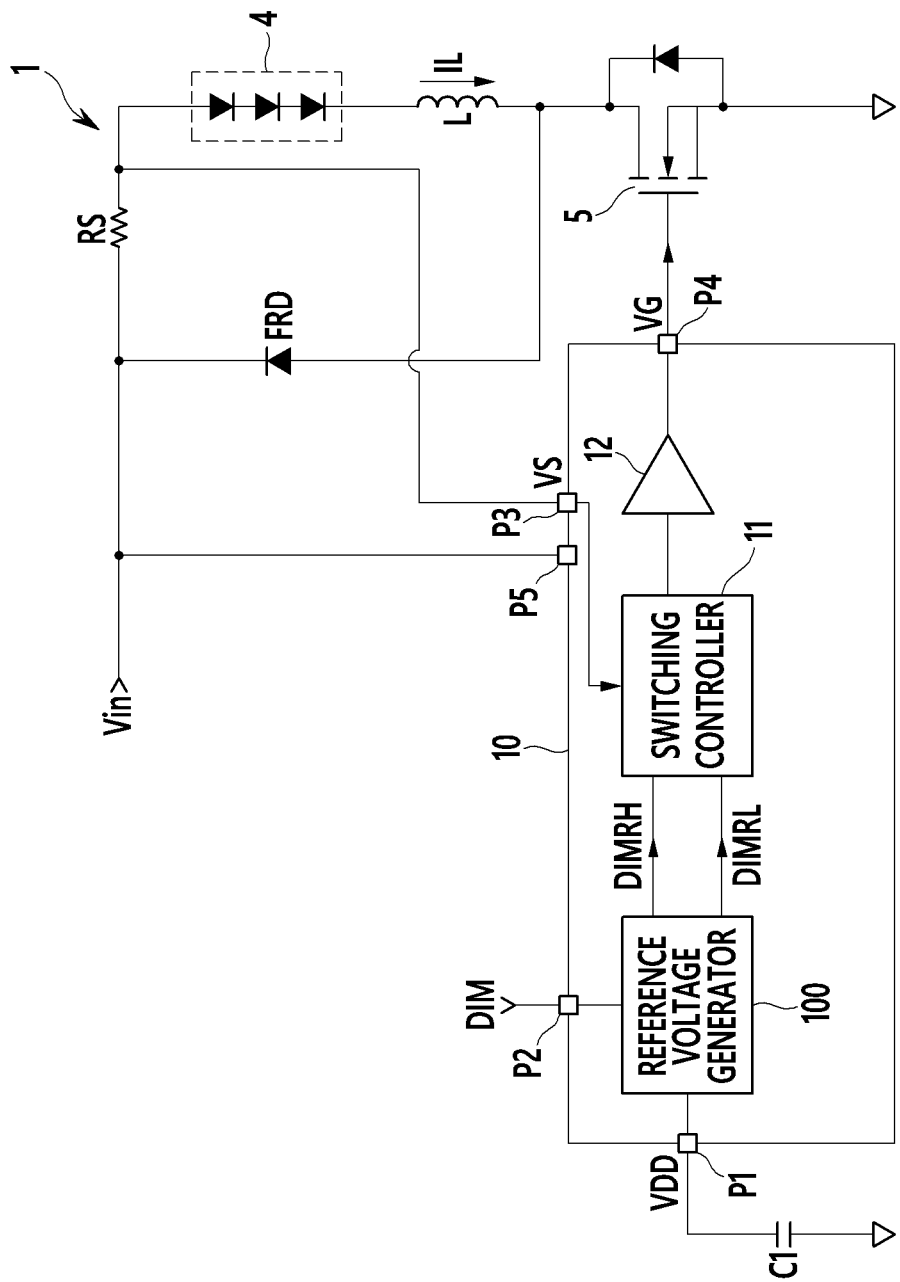
FIG. 1 is a diagram illustrating a reference voltage generator and a light emitting diode (LED) device including the same according to an embodiment of the present disclosure.

Hereinafter, embodiments of the present disclosure will be fully described in a detail which is suitable for implementation by those skilled in the art with reference to the accompanying drawings. However, the present disclosure may be implemented in various different forms, and thus it is not limited to the embodiments to be described herein. Also, in the accompanying drawings, parts not related to the description will be omitted in order to clearly describe the present disclosure, and similar reference numerals are given to parts having similar functions throughout the disclosure.

Throughout the disclosure, when parts are disclosed as "connected" to other parts, it should be understood that the parts can be "directly connected" to the other parts as well as can be "electrically connected" thereto by interposing other components therebetween. Also, when a part is described as "comprising" a component, this does not preclude the presence thereof and should be construed as being able to further include other components, unless there is a clearly different meaning in the present application.

FIG. 1 is a diagram illustrating a reference voltage generator and a light emitting diode (LED) device including the same according to an embodiment of the present disclosure.

An LED device 1 includes an LED string 4, a power switch 5, a diode FRD, an inductor L, a sensing resistor RS, and an LED driving circuit 10.

The sensing resistor RS includes one end to which an input voltage Vin is supplied, and the other end connected to the LED string 4. The input voltage Vin may be a direct current (DC) voltage.

The input voltage Vin is supplied to one end of the LED string 4, and the other end thereof is connected to one end of the inductor L. The diode FRD is connected between a drain electrode of the power switch 5 and the one end of the sensing resistor RS. During a period in which the power switch 5 is in an OFF state, the diode FRD may form a current path together with the LED string 4 and the inductor L.

The power switch 5 performs a switching operation according to a gate voltage VG, which is transmitted from the LED driving circuit 10, to control a current flowing at the LED string 4. The power switch 5 is implemented with an n-channel metal oxide semiconductor field effect transistor (NMOSFET). The present disclosure is not limited thereto, and another type transistor element may be employed as necessary.

The drain electrode of the power switch 5 is connected to the other end of the inductor L, and a source electrode of the power switch 5 is connected to a ground. The gate voltage VG transmitted from the LED driving circuit 10 is input to a gate electrode of the power switch 5. The power switch 5 is switched by the gate voltage VG.

When the power switch 5 is turned on, an inductor current IL, which is increased according to the input voltage Vin, flows through the LED string 4 and the power switch 5, and energy is stored in the inductor L by means of the inductor current IL.

When the power switch 5 is turned off, the inductor current IL is decreased during a period in which the energy exists, wherein the energy was stored in the inductor L during a period in which the power switch 5 was turned on. At this point, the inductor current IL, which is being decreased, flows to the LED string 4 through the diode FRD.

The inductor current IL is the same as an LED current flowing at the LED string 4, the inductor current IL flows through the sensing resistor RS, and a voltage VS, which is obtained by subtracting a voltage drop IL*RS at the sensing resistor RS from the input voltage Vin, is input to the LED driving circuit 10 through a pin P3.

The LED driving circuit 10 generates a high limit reference voltage DIMRH and a low limit reference voltage DIMRL according to a dimming signal DIM, and a gate voltage VG on the basis of comparison results between a sensing voltage VSEN and each of the high limit reference voltage DIMRH and the low limit reference voltage DIMRL. The dimming signal DIM is a signal for controlling a dimming of the LED device 1, and may be supplied from the outside of the LED device 1.

The LED driving circuit 10 may generate a high limit diming signal DIMH obtained by adding a high limit reference to the dimming signal DIM, and a low limit dimming signal DIML obtained by subtracting a low limit reference from the dimming signal DIM. When a voltage level of the dimming signal DIM is lower than a predetermined threshold value, the LED driving circuit 10 may generate the high limit diming signal DIMH and the low limit dimming signal DIML on the basis of the high limit reference and the low limit reference, respectively, which are varied according to the dimming signal DIM.

The LED driving circuit 10 may generate the high limit reference voltage DIMRH and the low limit reference voltage DIMRL on the basis of the high limit diming signal DIMH and the low limit dimming signal DIML, respectively. For example, the LED driving circuit 10 may generate the high limit reference voltage DIMRH and the low limit reference voltage DIMRL by scaling down the high limit diming signal DIMH and the low limit dimming signal DIML with a predetermined ratio.

As shown in FIG. 1, the LED driving circuit 10 includes a reference voltage generator 100, a switching controller 11, and a gate driving circuit 12. A configuration of the LED driving circuit 10 shown in FIG. 1 may be a partial configuration thereof.

A capacitor C1 is connected to a pin P1 of the LED driving circuit 10, and a voltage VDD charged at the capacitor C1 is supplied to the LED driving circuit 10. The voltage VDD is a source voltage required for an operation of the LED driving circuit 10. The capacitor C1 is charged by the input voltage Vin so that the voltage VDD may be generated.

The dimming signal DIM may be input through a pin P2, the voltage VS may be input through the pin P3, the gate voltage VG may be output through a pin P4, and the input voltage Vin may be supplied through a pin P5.

The reference voltage generator 100 may be biased by the voltage VDD, and may generate the high limit diming signal DIMH and the low limit dimming signal DIML by receiving the dimming signal DIM. When the voltage level of the dimming signal DIM is less than a threshold value, the reference voltage generator 100 may generate the high limit diming signal DIMH on the basis of the high limit reference varied according to the dimming signal DIM, and the low limit dimming signal DIML on the basis of the low limit reference varied according to the dimming signal DIM.

The reference voltage generator 100 generates the high limit reference voltage DIMRH and the low limit reference voltage DIMRL by scaling down the high limit diming signal DIMH and the low limit dimming signal DIML with a predetermined ratio.

Figure 2:
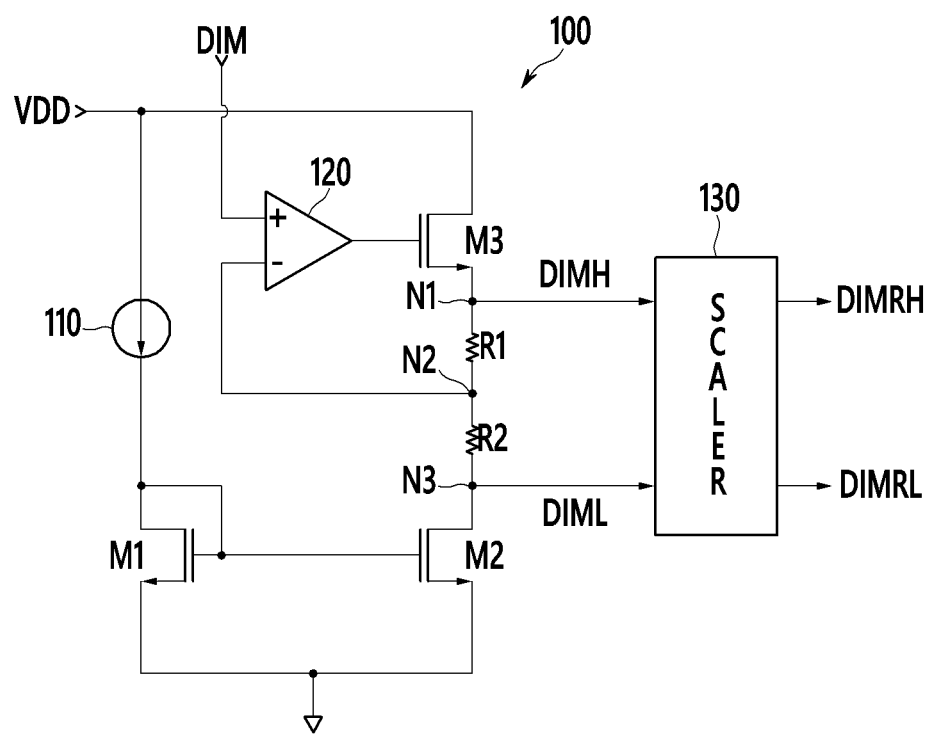
FIG. 2 is a diagram illustrating a partial configuration of the reference voltage generator according to an embodiment.

FIG. 2 is a diagram illustrating a partial configuration of the reference voltage generator 100 according to an embodiment.

As shown in FIG. 2, the reference voltage generator 100 includes a current source 110, an amplifier 120, two transistors M1 and M2 forming a current mirror, a transistor M3, two resistors R1 and R2, and a scaler 130.

The current source 110 may generate a constant current using the voltage VDD. The transistor M1 is connected between the current source 110 and a ground, and a gate and a drain of the transistor M1 are connected to each other such that the transistor M is biased by a current IM of the current source 110.

The gate of the transistor M1 and a gate of the transistor M2 are connected to each other, thereby forming a current mirror. The transistor M2 is connected between a node N3 and the ground. The two resistors R1 and R2 are connected in series between the node N3 and a node N1. The voltage VDD is supplied to a drain of the transistor M3, a source thereof is connected to the node N1, and a gate thereof is connected to an output terminal of the amplifier 120.

An inverting terminal (−) of the amplifier 120 is connected to a node N2, the dimming signal DIM is input to a non-inverting terminal (+) of the amplifier 120, and the amplifier 120 generates an output so as to have the same voltage at the node N2 as that of the dimming signal DIM.

When the voltage of the dimming signal DIM is equal to or greater than a threshold value, the transistor M2 operates in a saturation region, and a reference current ID, which depends on a gate voltage of the transistor M2, flows at the transistor M2. That is, the reference current ID depends on the current IM of the current source 110. Therefore, when one-to-one mirroring is performed by the current mirror, the reference current ID, which flows from the voltage VDD to the ground through the transistor M3, the two resistors R1 and R2, and the transistor M2, is the same as the current IM.

When the voltage of the dimming signal DIM is less than the threshold value, the transistor M2 operates in a linear region such that the reference current ID is affected by a drain-source voltage of the transistor M2. A level of a source voltage of the transistor M2 is constant at a level of the ground so that the reference current ID is determined by a drain voltage of the transistor M2. The drain voltage of the transistor M2 depends on the dimming signal DIM so that the reference current ID is decreased as the dimming signal DIM is decreased.

The high limit diming signal DIMH has a voltage obtained by adding a voltage corresponding to ID*R1 to the voltage of the dimming signal DIM, and the low limit dimming signal DIML has a voltage obtained by subtracting a voltage corresponding to ID*R2 from the voltage of the dimming signal DIM.

Since values of the reference current ID and the two resistors R1 and R2 are constant when the voltage of the dimming signal DIM is equal to or greater than the threshold value, the high limit reference, which is a difference between the high limit diming signal DIMH and the dimming signal DIM, and the low limit reference, which is a difference between the low limit dimming signal DIML and the dimming signal DIM, are constant.

Since the reference current ID is varied according to the dimming signal DIM when the voltage of the dimming signal DIM is less than the threshold value, the high limit reference and the low limit reference are varied according to the dimming signal DIM. The changing rates according to the dimming signal DIM of the high limit reference and the low limit reference may be different from each other. The changing rates of the high limit reference and the low limit reference can be controlled according to the resistance ratio of the resistor R1 and the resistor R2. Alternatively, the changing rates according to the dimming signal DIM of the high limit reference and the low limit reference may be the same. At this time, the resistor R1 and the resistor R2 can have the same resistance value.

Figure 3:
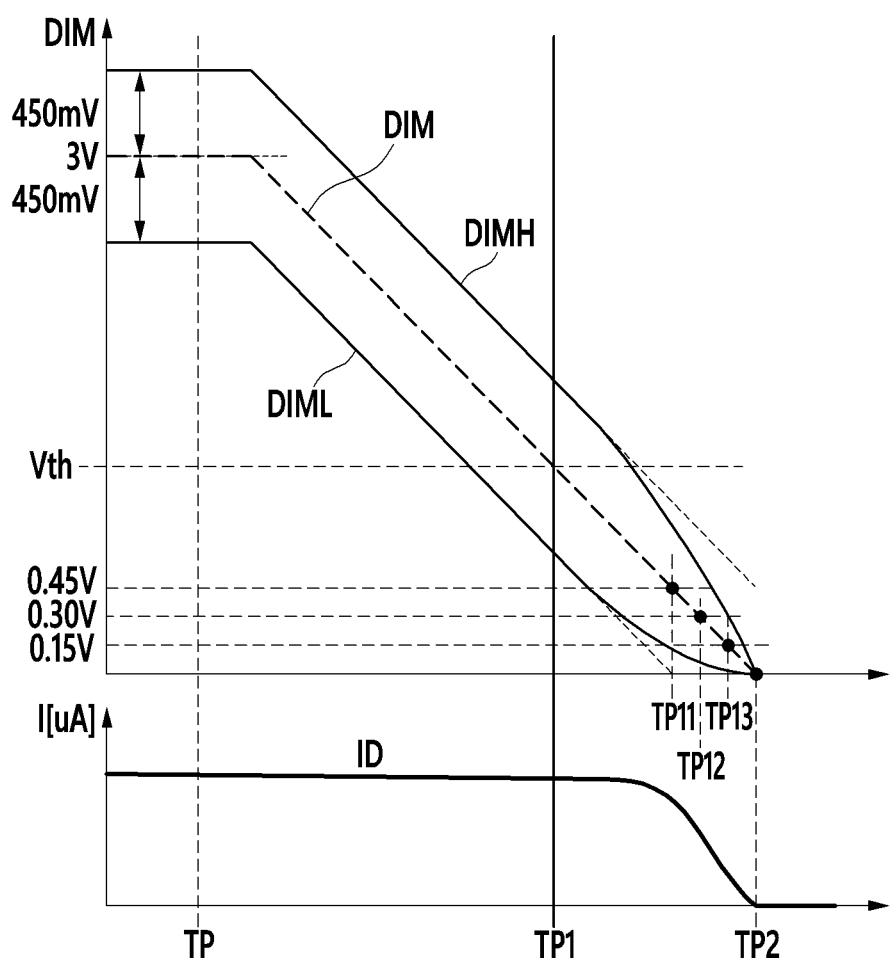
FIG. 3 is a waveform diagram illustrating a reference current, a dimming signal, a high limit dimming signal, and a low limit dimming signal according to an embodiment.

FIG. 3 is a waveform diagram illustrating a reference current, a dimming signal, a high limit dimming signal, and a low limit dimming signal according to an embodiment.

For convenience of a description, there is shown in FIG. 3 that a dimming signal DIM is decreased from 3 volts (V) to 0 V, but the present disclosure is not limited thereto. Further, levels of voltages of the dimming signal DIM, a high limit diming signal DIMH, and a low limit dimming signal DIML which are shown in FIG. 3 are merely examples, and the present disclosure is not limited thereto.

A voltage of the dimming signal DIM is decreased up to a threshold value Vth at a time point TP1. Prior to the time point TP1, a voltage of the high limit diming signal DIMH is generated by adding a high limit reference of 450 mV to the voltage of the dimming signal DIM, and a voltage of the low limit dimming signal DIML is generated by subtracting a low limit reference of 450 mV from the voltage of the dimming signal DIM. Prior to the time point TP1, a reference current ID is constantly maintained.

From the time point TP1, the reference current ID begins to be decreased as the voltage of the dimming signal DIM is decreased. As the reference current ID is decreased, the voltages of the high limit reference and the low limit reference, which are generated by the resistor R1 and the resistor R2, respectively, are decreased. That is, a difference between the high limit diming signal DIMH and the dimming signal DIM is decreased as the dimming signal DIM is decreased, and also a difference between the low limit dimming signal DIML and the dimming signal DIM is decreased as the dimming signal DIM is decreased.

When the voltage of the dimming signal DIM becomes 0 V at a time point TP2, the voltages of the high limit diming signal DIMH and the low limit dimming signal DIML are also become 0 V.

Referring back to FIG. 1, the switching controller 11 generates the sensing voltage VSEN by subtracting the voltage VS form the input voltage Vin, turns off the power switch 5 on the basis of a comparison result between the sensing voltage VSEN and the high limit reference voltage DIMRH, and turns on the power switch 5 on the basis of a comparison result between the sensing voltage VSEN and the low limit reference voltage DIMRL.

Since the voltage VS is Vin−(IL*RS), the voltage VS is subtracted from the input voltage Vin so that IL*RS, that is, the sensing voltage VSEN, which depends on the current flowing at the LED string 4, may be generated.

The switching controller 11 enables an ON signal when the sensing voltage VSEN, which is being increased, reaches the high limit reference voltage DIMRH, whereas it enables an OFF signal when the sensing voltage VSEN, which is being decreased, reaches the low limit reference voltage DIMRL.

The gate driving circuit 12 raises the gate voltage VG to a high level in synchronization with the ON signal, and it drops the gate voltage VG to a low level in synchronization with the OFF signal.

FIGS. 4A to 4D according to the embodiment are waveform diagrams illustrating a sensing voltage, a high limit reference voltage, and a low limit reference voltage.

In FIGS. 4A to 4D, it is assumed that a high limit reference voltage DIMRH and a low limit reference voltage DIMRL are generated by decreasing voltages of the high limit diming signal DIMH and the low limit dimming signal DIML by a scaling ratio of about 1/15 through the scaler 130. The scaling ratio is not limited thereto.

In FIGS. 4A to 4D, when the sensing voltage VSEN reaches the high limit reference voltage DIMRH, the power switch 5 is turned off such that the sensing voltage VSEN is decreased. When the sensing voltage VSEN, which is being decreased, reaches the low limit reference voltage DIMRL, the power switch 5 is turned on such that the sensing voltage VSEN is increased.

Figure 4A:
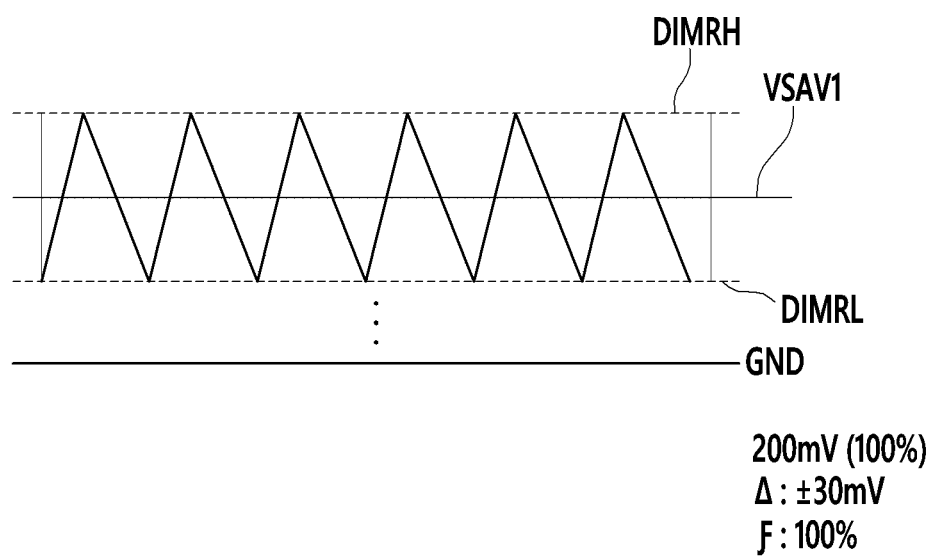
FIGS. 4A to 4D are waveform diagrams illustrating a sensing voltage, a high limit reference voltage, and a low limit reference voltage according to an embodiment.

Waveforms shown in FIG. 4A illustrate the sensing voltage VSEN, the high limit reference voltage DIMRH, and the low limit reference voltage DIMRL when the dimming signal DIM has a voltage at the time point TP0.

The time point TP0 is an example of an arbitrary time point before the voltage of the dimming signal DIM reaches the threshold value Vth, and the present disclosure is not limited thereto. In a condition in which the voltage of the dimming signal DIM is equal to or greater than the threshold value Vth, a swing width of the sensing voltage VSEN is determined according to a constant high limit reference and a constant low limit reference such that a switching frequency is constant regardless of the voltage level of the dimming signal DIM. The switching frequency in FIG. 4A is set to 100%.

As shown in FIG. 4A, an average VSAV1 of the sensing voltage VSEN has 200 mV that is a median between the high limit reference voltage DIMRH and the low limit reference voltage DIMRL. Since the average VSAV1 corresponds to a value of about 3V/15 according to the dimming signal DIM, the current flowing at the LED string 4 depends on the dimming signal DIM. The swing width of the sensing voltage VSEN according to the high limit reference and the low limit reference is about ±30 mV.

Figure 4B:
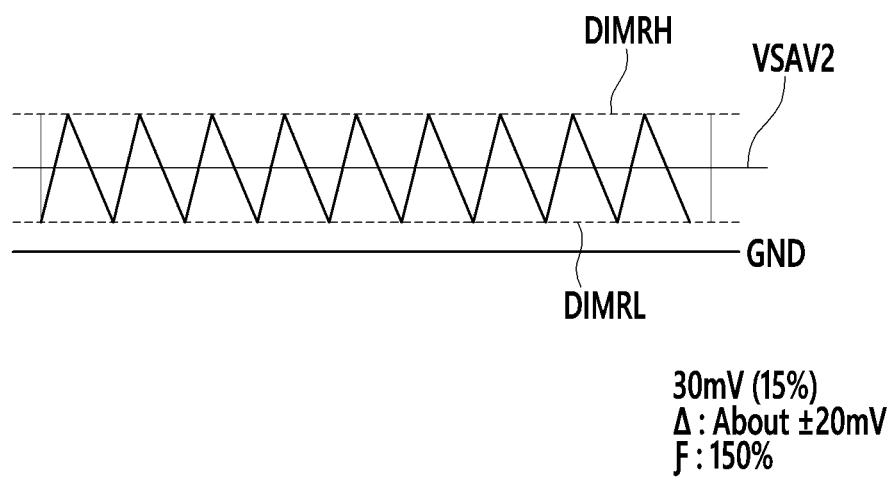

Waveforms shown in FIG. 4B illustrate the sensing voltage VSEN, the high limit reference voltage DIMRH, and the low limit reference voltage DIMRL when the voltage of the dimming signal DIM has 0.45 V at a time point TP11.

The time point TP11 is an arbitrary time point after the voltage of the dimming signal DIM reaches the threshold value Vth. Therefore, the high limit reference and the low limit reference have values which are decreased compared to those prior to the time point TP1 according to the dimming signal DIM at the time point TP11.

As shown in FIG. 4B, an average VSAV2 of the sensing voltage VSEN has 30 mV that is a median between the high limit reference voltage DIMRH and the low limit reference voltage DIMRL. Since the average VSAV2 corresponds to a value of about 0.45V/15 according to the dimming signal DIM, the current flowing at the LED string 4 depends on the dimming signal DIM. The swing width of the sensing voltage VSEN according to the high limit reference and the low limit reference is about ±20 mV. At this point, a switching frequency may have a value, which is increased by 50%, that is, 150%, compared to that of the switching frequency in FIG. 4A.

Figure 4C:
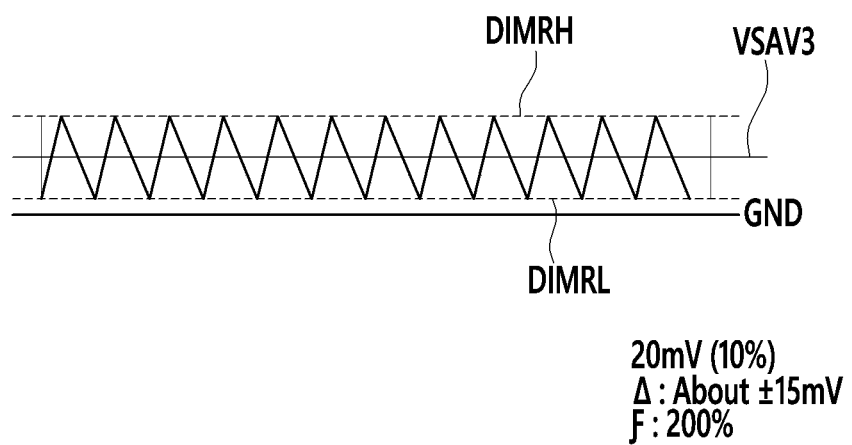

Waveforms shown in FIG. 4C illustrate the sensing voltage VSEN, the high limit reference voltage DIMRH, and the low limit reference voltage DIMRL when the voltage of the dimming signal DIM has 0.3 V at a time point TP12.

The time point TP12 is also an arbitrary time point after the voltage of the dimming signal DIM reaches the threshold value Vth. The high limit reference and the low limit reference have values which are more decreased than those at the time point TP11 according to the voltage of the dimming signal DIM at the time point TP12.

As shown in FIG. 4C, an average VSAV3 of the sensing voltage VSEN has 20 mV that is a median between the high limit reference voltage DIMRH and the low limit reference voltage DIMRL. Since the average VSAV3 corresponds to a value of about 0.3V/15 according to the dimming signal DIM, the current flowing at the LED string 4 depends on the dimming signal DIM. The swing width of the sensing voltage VSEN according to the high limit reference and the low limit reference is about ±15 mV. At this point, a switching frequency may have a value which is two times, that is, 200%, greater than that of the switching frequency in FIG. 4A.

Figure 4D:
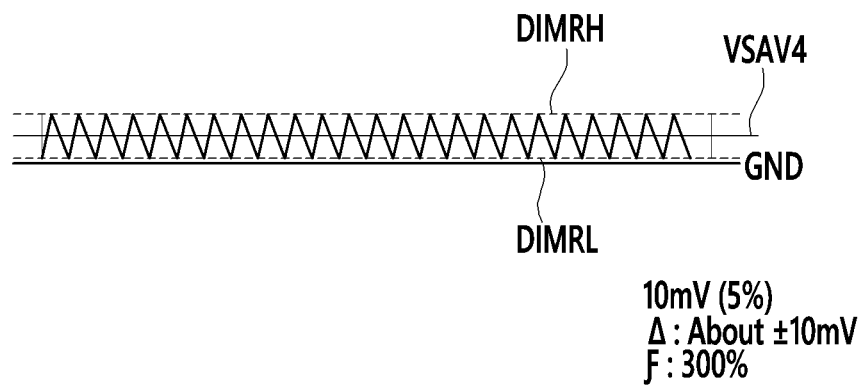

Waveforms shown in FIG. 4D illustrate the sensing voltage VSEN, the high limit reference voltage DIMRH, and the low limit reference voltage DIMRL when the voltage of the dimming signal DIM has 0.15 V at a time point TP13.

The time point TP13 is also an arbitrary time point after the voltage of the dimming signal DIM reaches the threshold value Vth. The high limit reference and the low limit reference have values which are more decreased compared to those at the time point TP12 according to the voltage of the dimming signal DIM at the time point TP13.

As shown in FIG. 4D, an average VSAV4 of the sensing voltage VSEN has 10 mV that is a median between the high limit reference voltage DIMRH and the low limit reference voltage DIMRL. Since the average VSAV4 corresponds to a value of about 0.15/15 V according to the dimming signal DIM, the current flowing at the LED string 4 depends on the dimming signal DIM. The swing width of the sensing voltage VSEN according to the high limit reference and the low limit reference is about ±10 mV. At this point, a switching frequency may have a value which is three times, that is, 300%, greater than that of the switching frequency in FIG. 4A.

As described above, the high limit reference and the low limit reference are varied according to a decrease of the dimming signal such that the LED string 4 may be controlled to brightness according to the dimming signal. In accordance with the embodiments, when low brightness is required, an LED string may precisely emit a small amount of light according to a dimming signal.

Although the present disclosure has been described by way of a plurality of embodiments, the scope of the present disclosure is not limited thereto, and numerous alterations and modifications, which can be devised by those skilled in the art using the fundamental concept of the present disclosure defined by the appended claims, will also fall within the scope of this disclosure.

What is claimed is:

1. A reference voltage generator comprising:
   an amplifier including two input terminals connected to a dimming signal and a first node, respectively, and an output terminal;
   a first transistor including a gate connected to the output terminal of the amplifier, and an electrode connected to the first node;
   second and third transistors configured to form a current mirror that flows a reference current through the second transistor; and
   two resistors connected between an electrode of the second transistor and the electrode of the first transistor, the two resistors being configured to receive the reference current to generate a high limit dimming signal that is higher than the dimming signal and a low limit dimming signal that is lower than the dimming signal,
   wherein the high limit dimming signal and the low limit dimming signal are varied according to the dimming signal when a voltage of the dimming signal is less than a predetermined threshold value.

2. The reference voltage generator of claim 1, wherein the amplifier controls a voltage at the first node with the dimming signal.

3. The reference voltage generator of claim 1, wherein, when the voltage of the dimming signal is less than the predetermined threshold value, the reference current is decreased as the dimming signal is decreased.

4. The reference voltage generator of claim 1, wherein a voltage obtained by adding a high limit reference, which is determined by the reference current flowing at a first resistor of the two resistors and the second transistor, to the dimming signal is output as a voltage of the high limit dimming signal, and the first resistor is connected between the first transistor and the first node.

5. The reference voltage generator of claim 1, wherein a voltage obtained by subtracting a low limit reference, which is determined by the reference current flowing at a second resistor of the two resistors and the second transistor, from the dimming signal is output as a voltage of the low limit dimming signal, and the second resistor is connected between the first node and the electrode of the second transistor.

6. The reference voltage generator of claim 1, further comprising a current source connected to the third transistor and configured to supply a constant current, wherein, when the voltage of the dimming signal is greater than the predetermined threshold value, the reference current flowing at the second transistor depends on the constant current.

7. A light emitting diode (LED) device comprising:
an LED string;
a power switch electrically connected to the LED string and configured to control a current flowing at the LED string;
an inductor connected between the LED string and the power switch; and
an LED driving device configured to generate a high limit dimming signal obtained by adding a high limit reference to a dimming signal and a low limit dimming signal obtained by subtracting a low limit reference from the dimming signal, and configured to control the current flowing at the LED string using the high limit dimming signal and the low limit dimming signal,
wherein, when a voltage of the dimming signal is less than a predetermined threshold value, the high limit reference and the low limit reference are varied.

8. The LED device of claim 7, wherein the LED driving device includes a reference voltage generator configured to generate the high limit dimming signal and the low limit dimming signal according to the dimming signal.

9. The LED device of claim 8, wherein the reference voltage generator includes:
an amplifier including two input terminals connected to the dimming signal and a first node, respectively, and an output terminal;
a first transistor including a gate connected to the output terminal of the amplifier and one electrode connected to the first node;
second and third transistors configured to form a current mirror; and two resistors connected between one electrode of the second transistor and one electrode of the first transistor.

10. The LED device of claim 9, wherein the amplifier controls a voltage at the first node with the dimming signal.

11. The LED device of claim 9, wherein, when the voltage of the dimming signal is less than the predetermined threshold value, a reference current flowing at the second transistor depends on the dimming signal.

12. The LED device of claim 11, wherein, when the voltage of the dimming signal is less than the predetermined threshold value, the reference current is decreased as the dimming signal is decreased.

13. The LED device of claim 11, wherein the high limit dimming signal and the low limit dimming signal are varied according to the reference current flowing at the second transistor.

14. The LED device of claim 13, wherein the reference voltage generator outputs a voltage obtained by adding the high limit reference, which is determined by the reference current flowing at a first resistor of the two resistors and the second transistor, to the dimming signal as a voltage of the high limit dimming signal, and the first resistor is connected between the first transistor and the first node.

15. The LED device of claim 13, wherein the reference voltage generator outputs a voltage obtained by subtracting the low limit reference, which is determined by the reference current flowing at a second resistor of the two resistors and the second transistor, from the dimming signal as a voltage of the low limit dimming signal, and the second resistor is connected between the first node and the one electrode of the second transistor.

16. The LED device of claim 11, further comprising a current source connected to the third transistor and configured to supply a constant current, wherein, when the voltage of the dimming signal is greater than the predetermined threshold value, the reference current flowing at the second transistor depends on the constant current.

17. The LED device of claim 7, wherein, when a voltage of the dimming signal is less than a predetermined threshold value, a changing rate of the high limit reference is different from a changing rate of the low limit reference.

18. The LED device of claim 7, wherein, when the dimming signal reaches a predetermined minimum value, the high limit dimming signal and the limit dimming signal are the same.

* * * * *